United States Patent
Zeng et al.

(10) Patent No.: US 10,573,876 B1
(45) Date of Patent: Feb. 25, 2020

(54) FUSE DESIGN FOR A LITHIUM-ION BATTERY

(71) Applicants: Qingcheng Zeng, San Jose, CA (US); Donald G. Dafoe, San Jose, CA (US)

(72) Inventors: Qingcheng Zeng, San Jose, CA (US); Donald G. Dafoe, San Jose, CA (US)

( * ) Notice: Subject to any disclaimer, the term of this patent is extended or adjusted under 35 U.S.C. 154(b) by 103 days.

(21) Appl. No.: 15/656,258

(22) Filed: Jul. 21, 2017

Related U.S. Application Data

(60) Provisional application No. 62/365,473, filed on Jul. 22, 2016.

(51) Int. Cl.
*H01M 2/34* (2006.01)
*H01M 2/20* (2006.01)
*H01H 71/16* (2006.01)

(52) U.S. Cl.
CPC ............ *H01M 2/348* (2013.01); *H01H 71/16* (2013.01); *H01M 2/202* (2013.01); *H01M 2200/101* (2013.01); *H01M 2200/103* (2013.01); *H01M 2200/106* (2013.01)

(58) Field of Classification Search
CPC .......... H01M 2/34; H01M 2/348; H01M 2/20; H01M 2/30
See application file for complete search history.

(56) References Cited

U.S. PATENT DOCUMENTS

| | | | |
|---|---|---|---|
| 5,801,612 A * | 9/1998 | Chandler | H01C 7/027 338/22 R |
| H1765 H | 12/1998 | O'Phelan et al. | |
| 5,993,698 A * | 11/1999 | Frentzel | H01C 7/028 252/511 |
| 2011/0095623 A1 | 4/2011 | Doh et al. | |
| 2011/0183165 A1* | 7/2011 | Byun | H01M 2/0202 429/61 |
| 2011/0183193 A1* | 7/2011 | Byun | H01M 2/0426 429/178 |

(Continued)

FOREIGN PATENT DOCUMENTS

| JP | H0467508 B2 * | 10/1992 | ............... B41J 2/25 |
|---|---|---|---|
| WO | 2015197625 A1 | 11/2015 | |

OTHER PUBLICATIONS

Yamada et al. JP H04-67508. 1992. English translation by EPO (Year: 1992).*

*Primary Examiner* — James Lee
(74) *Attorney, Agent, or Firm* — Kilpatrick Townsend & Stockton LLP

(57) ABSTRACT

Energy storage devices, battery cells, and batteries of the present technology may include an enclosure. The enclosure may house a cathode current collector and a cathode tab coupled with the cathode current collector. A cathode terminal may be accessible at an external location of these devices, and the cathode terminal may be electrically coupled with the cathode tab. The enclosure may also house an anode current collector and an anode tab coupled with the anode current collector. An anode terminal may be accessible at an external location of the devices, and the anode terminal may be electrically coupled with the anode tab. The devices may further include a fuse housed within the enclosure. The fuse may be positioned between the anode terminal and anode tab, and may also be in electrical communication with both the anode terminal and the anode tab.

14 Claims, 5 Drawing Sheets

(56) References Cited

U.S. PATENT DOCUMENTS

| | | | |
|---|---|---|---|
| 2013/0095372 A1* | 4/2013 | Kim | H01M 2/18 |
| | | | 429/178 |
| 2014/0272491 A1 | 9/2014 | Kohlberger | |
| 2016/0099458 A1* | 4/2016 | Tanaka | H01M 2/34 |
| | | | 337/416 |

* cited by examiner

FUSE DESIGN FOR A LITHIUM-ION BATTERY

CROSS-REFERENCE TO RELATED APPLICATION

This application claims the benefit of U.S. Application Ser. No. 62/365,473 filed Jul. 22, 2016, the entire disclosure of which is hereby incorporated by reference for all purposes.

TECHNICAL FIELD

The present technology relates to batteries and battery components. More specifically, the present technology relates to fuse designs that allow improved corrosion resistance and structural integrity of batteries.

BACKGROUND

In battery-powered devices, batteries are sometimes connected to electronic circuits through one or more fuses. Fuse performance can impact the overall performance of the battery-powered device.

SUMMARY

The present technology relates to energy storage devices, including battery cells and batteries, that include a fusing element associated with the anode side of the cell. These fusing elements may enable improved end-of-life capabilities of the energy storage devices, and may provide safer operating parameters. The fusing elements include both metal-based fusing elements and polymer based fusing elements as will be described throughout the disclosure.

Energy storage devices, battery cells, and batteries of the present technology may include an enclosure. The enclosure may house a cathode current collector and a cathode tab coupled with the cathode current collector. A cathode terminal may be accessible at an external location of these devices, and the cathode terminal may be electrically coupled with the cathode tab. The enclosure may also house an anode current collector and an anode tab coupled with the anode current collector. An anode terminal may be accessible at an external location of the devices, and the anode terminal may be electrically coupled with the anode tab. The devices may further include a fuse housed within the enclosure. The fuse may be positioned between the anode terminal and anode tab, and may also be in electrical communication with both the anode terminal and the anode tab.

The energy storage devices may also include a current bypass device coupled along an external position of the enclosure. The current bypass device may be configured to bypass current to the anode terminal during operation of the current bypass device. The fuse of the energy storage device may be a bimetallic component including copper cladded with a metal of higher resistivity than copper. For example, the metal of higher resistivity than copper may be any one or more materials including gold, zinc, nickel, brass, bronze, iron, platinum, carbon steel, lead, and stainless steel. The fuse may in embodiments be copper cladded on opposite ends of the metal of higher resistivity than copper, such as nickel or stainless steel.

The fuse may also be a layer of positive temperature coefficient ("PTC") material positioned between two regions of copper in exemplary energy storage devices. The two regions of copper may be or include tension springs configured to release away from one another along an axis perpendicular to the individual regions when the fuse is blown. In embodiments, the layer of PTC material may be configured to overcome the restoring force of the tension springs under normal operating conditions.

The PTC material may include a conductive material mixed with a binder in exemplary fuse designs of the present technology. The conductive material may include at least one material selected from the group consisting of silver, copper, zinc, nickel, and carbon-containing materials such as carbon black. The binder of exemplary PTC materials may include an acrylate polymer such as poly(methyl methacrylate). The PTC material may further include a gaseous agent contained within the binder under normal operating conditions. Exemplary gaseous agents may be characterized by molecules having an effective length below about 10 Å. The PTC material may be configured to release the gaseous agent at a thermal threshold, and the release of the gaseous agent may cause the fuse to blow.

The present technology also includes battery cells that may include a housing. The battery cells may include a cathode terminal positioned at an exterior of the housing, as well as an anode terminal positioned at an exterior of the housing. The housing may additionally contain a cathode current collector electrically coupled with the cathode terminal, as well as an anode current collector electrically coupled with the anode terminal. The battery cell may still further include a fuse included in series between the electrically coupled anode current collector and anode terminal. Exemplary battery cells may also include a device configured to provide current bypass to the anode terminal. Additionally, in embodiments, the fuse may be copper bonded with a metal having lower conductivity than copper or may be a PTC layer positioned between two copper extensions.

The present technology additionally includes batteries having an enclosure. The batteries may include a plurality of battery cells contained within the enclosure, and may also include a bus bar contained within the enclosure. The bus bar may connect at least two battery cells of the plurality of battery cells at external terminals of the at least two battery cells. The batteries may also include a heat-sensitive device positioned along the bus bar and coupling two portions of the bus bar between the at least two battery cells of the plurality of battery cells. The heat-sensitive devices of exemplary batteries may be configured to interrupt heat transfer along the bus bar from a first cell of the at least two battery cells of the plurality of battery cells to a second cell of the at least two battery cells. The heat-sensitive device may be configured to releasably couple two spring members of the bus bar in exemplary batteries of the present technology.

Such technology may provide numerous benefits over conventional technology. For example, the present devices may help preserve structural integrity of the device from chemical modification of the enclosure. Additionally, the improved fuse designs can be applied to a number of situations providing a heat-based safety device that can protect coupled cells from being damaged from upstream cell issues. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1A:
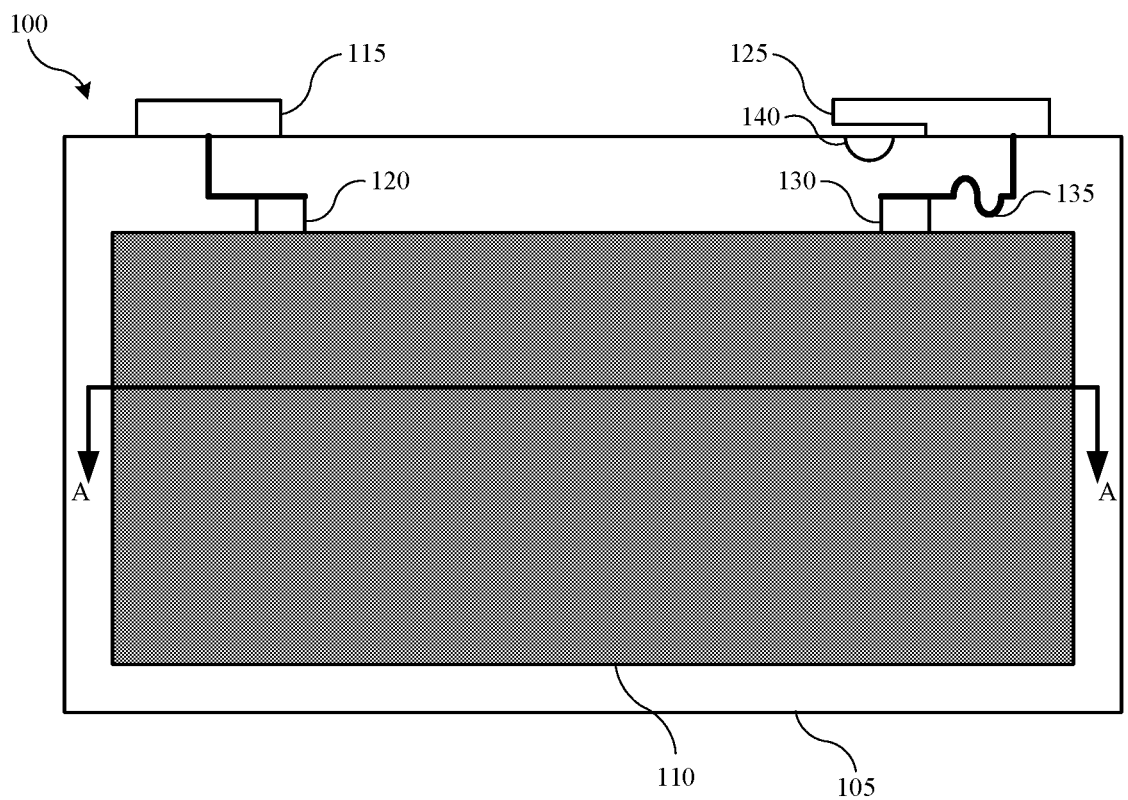
FIG. 1A shows a schematic view of an energy storage device according to embodiments of the present technology.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, may be made from a host of materials. These devices may include one or more safety features including a fuse, for example, that may protect the devices from battery or other failures. Fuses may be resettable or non-resettable in different designs. Resettable fuses may be used to protect against events including momentary current surges that may damage the device if allowed to persist, but are not necessarily indicative of a faulty battery. Non-resettable fuses may be used in numerous designs to protect against more permanent failure conditions such as electrical shorts.

A fuse may be positioned in a variety of positions within the battery, but is often located in the electrical couplings between the cell and the terminals. Conventional battery designs, such as for lithium-ion batteries, routinely locate the fuse on the cathode side of the battery. The cathode location may be made of materials suitable for relatively higher voltages, including aluminum, for example, and the fuse may be made of a similar material. If a situation occurs that blows the fuse at the cathode, such as an overcharge current, a current bypass may engage in the device at the anode, for example, to prevent further operation of the cell. For a typical user, this may constitute an end-of-life event for the battery or energy storage device. Although the user may simply exchange batteries, the now-inoperable battery may be processed for recycling. However, while the battery may be stored prior to processing, the issues with the battery may not truly be resolved.

When such a conventional battery as described has a fuse blow at the cathode, and a current bypass engages at the anode, for example, the enclosure of the cell or battery may then drop to anode potential of several millivolts, for example. Depending on the construction of the enclosure, this may cause further issues. Many batteries or energy storage devices may employ aluminum or some similar material as part or all of the enclosure. At typical operating potentials, this aluminum enclosure is protected, as aluminum is very stable at potentials of 3 or 4 volts. However, after the cathode fuse blows, the enclosure may drop to anode potential of 0.2 volts, 0.01 volts or lower. At these anode potentials, aluminum is less stable and more reactive.

In many cell designs, the aluminum enclosure is additionally wetted with electrolyte on the interior surfaces. This electrolyte allows lithium ions, for example, within the cell to interact with the aluminum enclosure. While not causing an issue at cathode potential, at anode potentials aluminum may react with lithium creating an alloy having increased structural volume. As the reaction continues, leaks may eventually develop in the aluminum structure allowing the often toxic electrolyte materials to escape the cell or battery, which can cause extensive damage and corrosion to surrounding surfaces. If a number of batteries are stored together, these materials can then interact with other batteries or cells causing significant damage and safety concerns from the egress of electrolyte materials.

The present technology overcomes these issues by utilizing improved fuse and battery designs. By moving the fuse to the anode side of the battery in exemplary designs of the present technology, the enclosure can be maintained off anode potential even after a fault event. However, because of the different electrical and electrochemical requirements of the anode side of a cell, a fuse cannot simply be swapped from the cathode to the anode. Accordingly, the present technology additionally encompasses fuse designs that may be configured specifically for use on the anode side of a device.

Although the remaining portions of the description will routinely reference lithium-ion batteries, it will be readily understood by the skilled artisan that the technology is not so limited. The present designs may be employed with any number of battery or energy storage devices, including other rechargeable battery types as well as non-rechargeable designs. Accordingly, the disclosure and claims are not to be considered limited to any particular example discussed, but can broadly be utilized with any number of devices that may exhibit some or all of the electrical or chemical characteristics of the discussed examples.

Turning to FIG. 1A is shown a schematic view of an energy storage device 100 according to embodiments of the present technology. Energy storage device 100 may be a battery cell or may be a composite battery. Energy storage device 100 may be characterized by a number of structural configurations including a cylindrical cell design, a jelly roll design, a pouch design, or a prismatic design, for example. As illustrated, energy storage device 100 may include an enclosure 105 housing a number of cell components. Enclosure 105 may be or include a pouch, a shell, a housing, or a hard-casing in embodiments, which may be made of or include a metal or a metal-containing material. The metal composing or included in the enclosure 105 may be one or more metals including aluminum, for example, however the metal may be any material that is typically stable at cathode operating potentials such as above or about 2 V, above or about 2.5 V, above or about 3 V, above or about 3.5 V, above or about 4 V, or above or about 4.5 V.

Enclosure 105 may house cell material 110, which may be a jelly roll or layers of material as further discussed with reference to FIG. 1B below. The cell material 110 may be electrode materials for an anode and cathode of an electrochemical cell. Enclosure 105 may also include cathode terminal 115 and anode terminal 125, which both may be accessible at an external location of the enclosure 105. Terminals 115 and 125 may include an internally accessible face and an externally accessible face with respect to the enclosure 105 such that the interior cell components can be electrically coupled with an external load. The internally accessible faces of the terminals 115 and 125 may be electrically coupled with a cathode tab 120 and an anode tab 130 respectively, which may be housed within the enclosure and coupled with the cell material 110 in embodiments.

More specifically, cathode terminal 115 may be electrically coupled with cathode tab 120, and anode terminal 125 may be electrically coupled with anode tab 130. Although illustrated with electrical lines between the terminals and tabs, the electrical couplings between the terminals and tabs may take any number of forms including direct couplings, bonding pads, or trace lines connecting the components. Additionally, in some embodiments certain of the illustrated features may not be included. For example, exemplary devices may not include a terminal and tab as separable elements, and may instead be characterized by a common material element operating as both features.

Energy storage device 100 may also include one or more safety components in the cell including a fuse 135, and a current bypass device 140. The fuse 135 may be housed within the enclosure 105, and may be positioned between the anode terminal 125 and anode tab 130. Fuse 135 may be in electrical communication with, and may be the electrical coupling between, anode terminal 125 and anode tab 130, and may be electrically coupled in series with these components. Additional material may also be used to electrically couple anode terminal 125, fuse 135, and anode tab 130, including, for example, copper lines, traces, or structures coupled with the enclosure 105.

Current bypass device 140 may be coupled along an external position of enclosure 105 in embodiments, and may be the same or a different material used in enclosure 105. For example, if the enclosure includes aluminum, the current bypass device may also be aluminum. The current bypass device 140 may also be a different metal or metal-containing material, and may include stainless steel, or a variety of other metals. The current bypass device 140 may also be a reduced thickness from the rest of the enclosure 105 such that although it may continue to conduct electricity along the enclosure, it may be receptive to pressure differences within the enclosure. Hence, the current bypass device 140 may be caused to bow outwards at increased operating pressures, and return to an inward bow as pressures return to normal operating pressures.

When operated, the current bypass device 140 may be configured to bypass current to the anode terminal 125 when engaged. Under normal operating conditions, however, the current bypass device 140 may be electrically separated from anode terminal 125. The current bypass device 140 may operate as a membrane along the exterior of the enclosure 105, which may be affected by pressure increases within the enclosure. An example scenario may enable better understanding of the present design features, although the example is not intended to limit the scope of the present technology.

During a charging operation, current may enter energy storage device 100 at the cathode terminal 115 from a charging source. If a malfunction occurs, overcharging may increase the voltage into the cell above safe operating limits of, for example, about or above 4 V. Increased current may cause a temperature increase within the device, which may blow fuse 135 at its designed fault temperature. This may also cause pressure to build within enclosure 105 causing current bypass device 140 to engage with anode terminal 125. When this occurs, current may flow from cathode terminal 115 along enclosure 105 and current bypass device 140 to anode terminal 125. Because the current bypass device 140 allows current to circumvent the cell material 110, this will allow protection of the cell material 110 within the cell from the received current, and will also maintain the enclosure 105 at cathode potential. In this way, if the battery is then stored, the battery is unlikely to exhibit the alloying at anode potential discussed above, which can cause corrosion and electrolyte leakage from the device, despite that the battery is not technically in use.

Figure 1B:
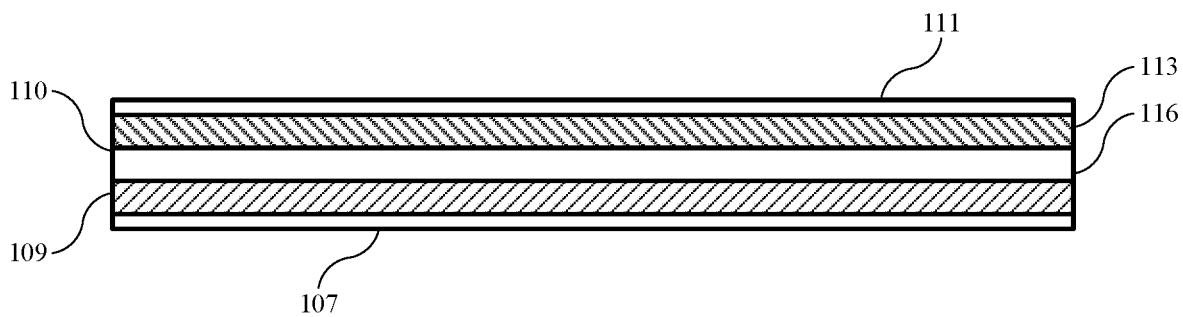
FIG. 1B shows a cross-sectional view along line A-A of FIG. 1A according to embodiments of the present technology.

FIG. 1B shows a cross-sectional view along line A-A of FIG. 1A according to embodiments of the present technology. This view shows exemplary layers of cell material 110, each layer of which would be housed within enclosure 105 of FIG. 1A. As would be readily understood, the layers are not shown at any particular scale, and are intended merely to show the possible layers of cell material 110. As illustrated, cell material 110 may include a cathode current collector 107, which may be coupled with a cathode electrode material 109. In embodiments, cathode current collector 107 may be aluminum, and may also be alternative metals or conductive materials that may be stable at potentials above about 3 V, for example. Cathode current collector 107 may be coated or coupled with a cathode active material 109, which may include a lithium-containing compound in embodiments.

Cell material 110 may also include an anode current collector 111, which may be coupled with an anode electrode material 113. Anode current collector 111 may be copper in embodiments, and may also be alternative metals or conductive materials that may be stable at potentials below about 1 V, for example. Anode current collector 111 may be coated or coupled with anode active material 113, which may include a carbon-containing compound in embodiments. A separator 116 may be disposed between the electrodes, and may be a polymer film or a material that may allow lithium ions to pass through its structure while not otherwise conducting electricity.

The current collectors 107, 111 may include portions that are uncoated with electrode or active material. These portions may be the tabs discussed previously. Accordingly, cathode current collector 107 may include cathode tab 120, which may be an uncoated portion of the cathode current collector. Similarly, anode current collector 111 may include anode tab 130, which may be an uncoated portion of the anode current collector. In these situations, the tab may be the same material as the current collector. However, alternative metals or conductive materials may be used for the tabs in embodiments. For example, anode current collector 111 may be copper, and anode tab 130 may be copper, nickel, or some other material.

Although illustrated as single layers of electrode material, cell material 110 may be any number of layers. Although the cell may be composed of one layer each of anode and cathode material as sheets, the layers may also be formed into a jelly roll design, or folded design, such that any number of layers may be included in cell material 110. For embodiments which include multiple layers, the tab portions of each anode current collector may be coupled together, as may be the tab portions of each cathode current collector.

Figure 2A:
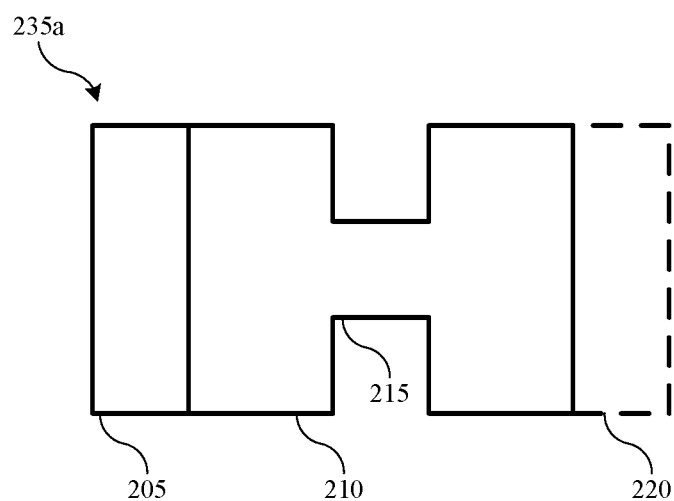
FIG. 2A shows an exemplary fuse design according to embodiments of the present technology.
Figure 2B:
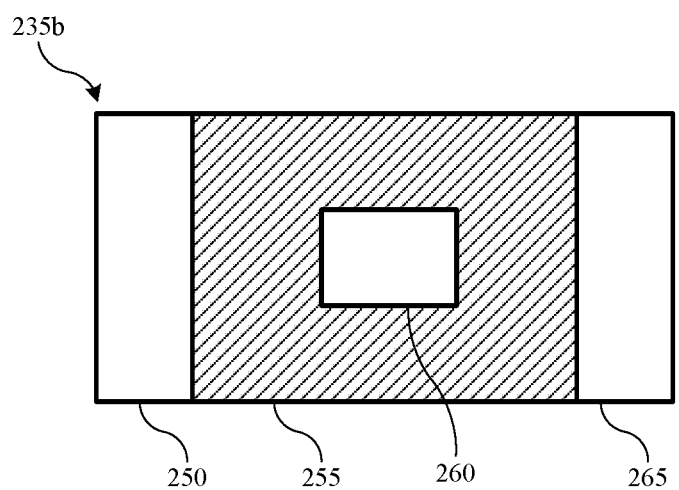
FIG. 2B shows an exemplary fuse design according to embodiments of the present technology.

FIGS. 2A and 2B show exemplary fuse designs 235 according to embodiments of the present technology. As illustrated, fuses 235 may include one or more sections of material included in the electrical path between the cell material 110 and anode terminal 125 as previously discussed. Fuses 235 may be or include a bimetallic component, which may include two dissimilar metals combined or bonded together. The fuses 235 may additionally include a number of metals or conductive materials in embodiments. Because fuse 235 may be included within the device enclosure, there may be a low risk of corrosion between the metals from an oxygen environment.

FIG. 2A illustrates an exemplary fuse 235a, which may include a section 210 having a portion 215 characterized by a reduced cross-section. Section 210 may be bonded or coupled with anode tab 130 and anode terminal 125 in embodiments, or fuse 235a may include one or more additional sections coupled with section 210. By having the higher resistivity, the component is likely to heat more than the first metal sections, facilitating fusing in section 210. For example, fuse 235a may be coupled with section 205 which may be a dissimilar metal or material to section 210. For example, section 205 of fuse 235a may be a first metal, while section 210 may be a metal having a higher resistivity, or lower conductivity, than the first metal in embodiments. For example, section 205 may be copper, and section 210 may be nickel cladded or otherwise bonded with copper section 205. Section 210 may also be gold, zinc, nickel, brass, bronze, iron, platinum, carbon steel, lead, stainless steel, or any other metal or material that may have a higher resistivity than copper, or whatever material is used in section 205.

Fuse 235a may optionally include section 220, which may be the same material as section 205, or may be an alternative material to either section 205 or 210. For example, section 205 and section 220 may be copper cladded on opposite ends of nickel or stainless steel at section 210. Reduced cross-section portion 215 may be sized based on the properties of the material being used. For example, the size of portion 215 may be determined based on the metal being used and the temperature at which it is meant to melt or break. Additionally, the length may be based on potential voltages that may occur at either end of section 210 to ensure that arcing does not occur across blown portion 215. For example, if section 210 is composed of nickel, and the temperature at which the fuse blows is determined to be 130° C., the dimensions of portion 215 can be determined as would be appreciated by one of skill.

FIG. 2B shows an additional exemplary fuse 235b, which may include section 255 in embodiments. Fuse 235b may also include one or more of sections 250 and 265 in embodiments, which may be the same or different material as section 255. Fuse 235b may include any of the features or materials as discussed above with regard to fuse 235a. Fuse 235b may have a cut-out 260 from section 255 in order to provide the fusing capability at higher temperature. The cut-out 260 may have dimensions determined in similar ways to reduced cross-section 215 discussed above. Fuse 235b may operate similarly to fuse 235a, but may provide additional structural rigidity, such as improved torsional rigidity, over fuse 235a. Such a design may provide benefits including ease of manufacturing. Although two fuse designs are shown for fuse 235, it is to be understood that any number of additional designs may be used that employ the materials and couplings discussed.

Figure 3A:
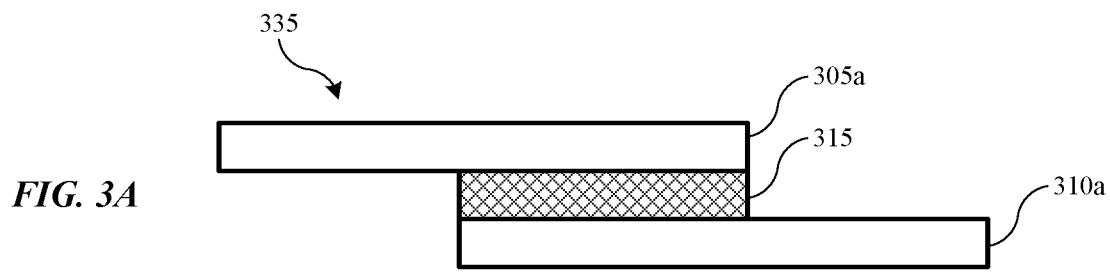
FIG. 3A shows an exemplary fuse design during normal operation according to embodiments of the present technology.

FIG. 3A shows an exemplary fuse design 335 during normal operating conditions according to embodiments of the present technology. Unlike the metallic fuses illustrated in FIGS. 2A and 2B, FIG. 3A illustrates a polymer-based fuse design 335. In embodiments, polymer fuse 335 may include a layer of positive temperature coefficient ("PTC") material 315 positioned between two conductive regions 305 and 310. In energy storage devices in which fuse 335 is an anode fuse, the conductive regions may be metallic regions, and may be two regions of copper or copper-containing materials in embodiments.

Unlike many conventional PTC fuses, fuse 335 may be located within the energy storage device, such as at fuse position 135 discussed above. Conventional PTC fuses may include a polymer that is itself conductive at low temperature, but which becomes highly resistive at increased temperature. Thus, when the temperature returns to normal operating conditions, the polymer recovers its conductive properties. Although fuse 335 may be designed to be resettable, fuse 335 may be designed to allow minimal resetting, or be non-resettable in embodiments. Thus, fuse 335 may be able to overcome the temperature increase of a momentary event, however the fuse 335 may be configured so that during major fault conditions like overcurrent or short-circuit, the fuse 335 may be blown as will be further described below.

In order to provide the non-resettable characteristics of fuse 335, both the layer of PTC material 315, and the conductive regions 305, 310 may be modified with characteristics intended to ensure the fuse does not reset. Conductive regions 305, 310 may be extensions of conductive material, such as copper, which may include tabs or other geometries that overlap, while maintaining a separation in between the two regions for the layer of PTC material 315. Conductive regions 305, 310 may also be modified to exhibit tension along an axis perpendicular to the overlapping portions of conductive regions 305, 310. For example, conductive regions 305, 310 may be formed to exhibit tension in a particular direction. The material used for conductive regions 305, 310 may operate as a spring, for example, and may be any type of spring that may perform the function of releasing the conductive region back to an equilibrium position away from the opposite conductive region. Accordingly, conductive regions 305, 310 may be tension springs in embodiments configured to release away from one another when the fuse is blown.

Conductive regions 305, 310 may operate as leaf springs, or any other tension spring. The layer of PTC material may be configured or designed to overcome the restoring force of the conductive regions 305, 310 under normal operating conditions, such as shown with conductive regions 305a, 310a. For example, the equilibrium position of conductive regions 305a, 310a may be away from each other, and the layer of PTC material 315 may be applied to the conductive regions and may be characterized under particular conditions by a sufficient strength or bond to overcome the restoring force of the springs. Thus, the layer of PTC material 315 may be characterized by material properties so that under normal operating conditions of the energy storage device in which it is applied, it has a stronger bonding force than the restoring force of the individual tension springs. However, as conditions change as a result of fault conditions that may increase the current as well as the temperature across the layer of PTC material, the PTC material may be caused to fail.

For example, the layer of PTC material may be characterized by a particular first bonding force at a first temperature within the normal operating range of the energy storage device in which the layer of PTC material is employed. Additionally, the layer of PTC material may be characterized by a second bonding force lower than the first bonding force at a second temperature above the normal operating range of the energy storage device in which the layer of PTC material is employed. The first bonding force of the layer of PTC material may be greater than the combined restoring force of the two conductive regions 305, 310. The second bonding force of the layer of PTC material, however, may be less than the individual or combined restoring force of the two conductive regions 305, 310. Accordingly, at the temperature associated with the second bonding force of the layer of PTC material, the conductive regions, which may be tension springs, may overcome the bonding force of the layer of PTC material and release, thereby blowing the fuse. The temperature at which the layer of PTC material is configured to fail to overcome the restoring forces of the conductive regions may be sufficiently above the normal operating window of the energy storage device to prevent a fault condition prematurely. In this way, the PTC materials of the present technology exhibit both structural aspects and electrical aspects for their particular use. Structurally, the PTC materials may be configured to overcome the restoring forces of spring elements. Electrically, the PTC materials may be configured or modified to operate under varying conditions as will be explained further below.

Figure 3B:
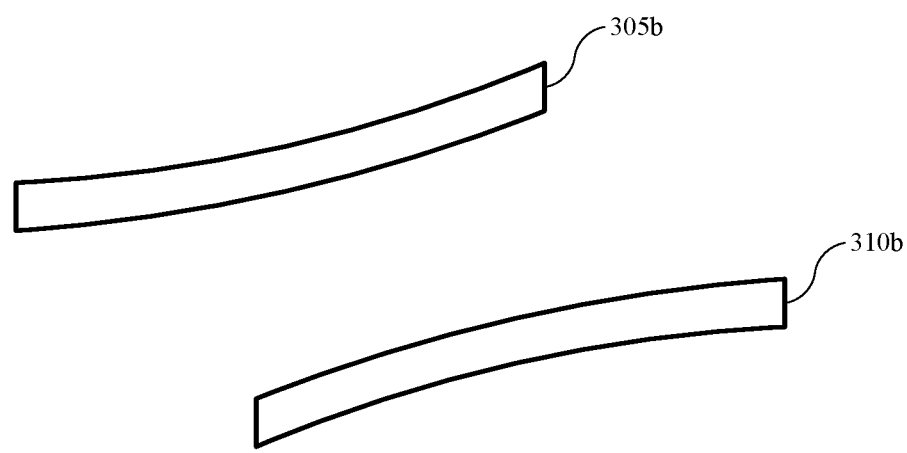
FIG. 3B shows an exemplary fuse design under fault conditions according to embodiments of the present technology.

FIG. 3B shows an exemplary fuse design under fault conditions according to embodiments of the present technology. As illustrated, conductive regions 305b, 310b have released to their equilibrium positions away from one another. By releasing to these positions, the fuse may be blown as the conductive path between the anode tab and anode terminal has been terminated. Conductive regions 305, 310 may be extensions of the anode tab and anode terminal in embodiments, or may be separate elements of the design providing electrical communication between the components. To operate as spring members of the fuse, conductive regions 305, 310 may be composite materials formed to include a specific tension. For example, the conductive regions 305, 310 may be copper-containing regions that have been manufactured with a specific tension. The copper-containing regions may include beryllium, for example, or additional additives that may be used to cause or form a tension within the material, or may specifically deform the material, such as including the leaf-spring style design as illustrated in the figure.

Figure 3C:
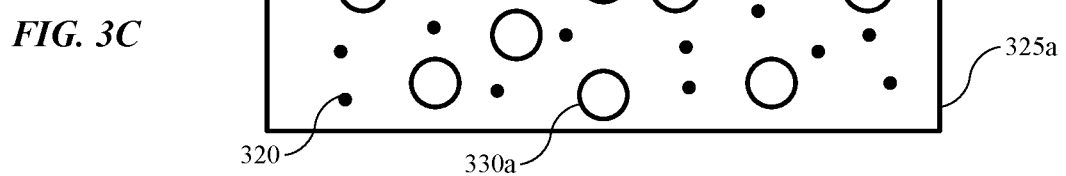
FIG. 3C shows an exemplary fuse component under normal operation according to embodiments of the present technology.

Characteristics of the PTC material may additionally or alternatively provide the function of separating the conductive regions 305, 310. FIG. 3C shows an exemplary layer of PTC material 315 under normal operation according to embodiments of the present technology. The PTC material may include one or more materials in the design that provide conductive properties under normal operating conditions, while providing a current interruption at fault conditions. PTC material 315 may include a polymer material as well as a binder material. The polymer may include a long-chain polymer, including polyethylene or polypropylene, for example. The binder may include an acrylate or an acetate, such as poly(methyl methacrylate), or poly(vinyl acetate). The components may include many additional or alternative polymeric components in embodiments that provide the structural forces to couple with the conductive regions 305, 310, and overcome the tensile forces if the conductive regions are operating as spring elements.

In embodiments, the PTC material 315 may operate as the fusing element of fuse 335, and may itself impart the conductive properties to ensure current flow across the device. In embodiments, the PTC material is designed and made to function with low impedance at normal operating conditions of an energy storage device, and is designed to function at high impedance at a determined temperature exceeding normal operating conditions of an energy storage device. When temperatures exceed a threshold fault temperature for the energy storage device, the PTC material may be configured to swell, which may separate the conductive carbon of the polymer. This action alone may cause the impedance across the PTC layer to increase prohibitively and interrupt the current flow.

For example, under normal operating temperatures, the PTC layer may impart an impedance of less than or about 1 milliohm, less than or about 0.1 milliohms, less than or about 0.01 milliohms, or between about 0.001 milliohms and about 0.1 milliohms. As the temperature exceeds acceptable limits of the normal operating window, the PTC layer may provide an increased impedance as the structure of the PTC layer adjusts due to the increased temperature. For example, the impedance may increase to more than or about 1 megaohm, more than or about 5 megaohms, more than or about 10 megaohms, more than or about 20 megaohms, or more than or about 50 megaohms by separating the conductive materials, such as carbon, within the structure of the material. This may also provide a resettable structure in that as the temperature decreases, the impedance may also decrease to the original conditions.

The PTC material 315 may include additional materials in addition to the polymeric materials discussed. For example, the polymeric materials may provide a structure 325a that incorporates and contains additional conductive material 320 mixed with the binder or polymer of the PTC material 315. The conductive material 320 may aid operation of the conductive path during normal operation. For example, conductive material 320 may include a powder of conductive material that is mixed with the polymeric structure 325a. The conductive material 320 may provide enhanced conductive paths through the PTC material 315 in order to maintain a low impedance through the fuse element. The conductive material may be particulate or powders of conductive materials including silver, copper, zinc, nickel, carbon-containing materials including carbon black, or other conductive materials that may be admixed with polymeric components such as those previously discussed.

Upon realizing temperatures that exceed a determined operating window for an exemplary energy storage device, the polymeric structure 325a may swell sufficiently to separate or isolate the conductive material 320, which may produce an impedance increase sufficient to interrupt current flow through the device. The swelling of structure 325a may be on the order of a few microns, for example. The PTC material 315 may be contained between conductive regions 305, 310 at a thickness of from about 1 µm to about 50 µm in embodiments. The thickness of the PTC material 315 may also be from about 3 µm to about 30 µm, or from about 5 µm to about 20 µm. The swelling may be less than about 20 µm increase in thickness, less than about 15 µm increase in thickness, less than about 10 µm increase in thickness, less than about 5 µm increase in thickness, or less than about 1 µm increase in thickness. The swelling may produce a reduction in the bonding strength of the PTC material 315.

Thus, when used in non-resettable embodiments, conductive regions that may be tension springs may overcome the bonding force of the PTC material 315, and release from the PTC material 315 thereby permanently interrupting current through the cell structure of an exemplary energy storage device.

PTC material 315 may additionally include a gaseous agent 330 within the structure 325a that is maintained within the structure 325a under normal operating conditions. Under normal operating conditions, small molecules or bubbles of gaseous agent 330a may be included within the structure. The gaseous agent 330 may be small molecules to ensure the bubbles to do not prevent conductive material, if included, from maintaining a sufficient conductive path through the structure 325. For example, the gaseous agent may include bubbles of a molecular component characterized by an effective length of the molecule below about 20 Å. Molecules having a tetrahedral arrangement, such as methane, for example, may be characterized by a molecular diameter that is equal to the effective length of the molecule. However, larger molecules may be characterized by a diameter across the molecule that is smaller than the effective length of the molecule, such as in the case of ethane along the carbon bond. Exemplary materials that may be utilized as the gaseous agent 330 include methane, ethane, ethylene, as well as a variety of other molecules having an effective length below about 20 Å. In embodiments, the materials used as the gaseous agent 330 may have an effective length of a molecule of the gaseous agent below about 15 Å, below about 10 Å, below about 8 Å, below about 6 Å, below about 5 Å, or below about 4 Å.

In operation, the gaseous agent 330a may be contained within the structure as a series of bubbles. The total amount of gaseous agent 330 may be less than or about 1 mL within the structure 325 of PTC material 315, and may be less than or about 0.1 mL, less than or about 0.01 mL, less than or about 0.001 mL, or less than or about 0.0001 mL. As current flows through the PTC layer 315 during normal operation, there may be no effect within the structure 325a or materials contained within the structure 325a. However, as the current increases, such as due to a fault condition including overcurrent or a short circuit, the temperature across PTC layer 315 may increase. As the temperature across the PTC layer increases, the bubbles of gaseous agent 330a may expand in volume. This expansion may separate the structure 325a of PTC layer 315, which may cause the fuse 335 to blow.

Figure 3D:
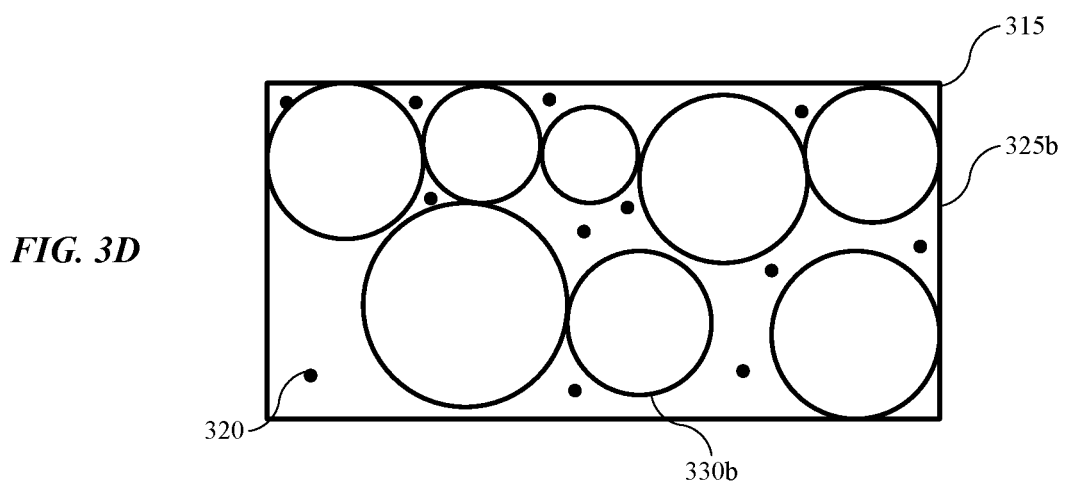
FIG. 3D shows an exemplary fuse component under fault conditions according to embodiments of the present technology.

FIG. 3D shows an exemplary PTC element 315 component under fault conditions according to embodiments of the present technology. The temperature across the PTC material 315 may be increasing, for example, and the bubbles of gaseous agent 330b may be expanding, causing an increase in the thickness of structure 325b. As the bubbles of gaseous agent 330b continue to expand, particles of the conductive material 320 may separate from one another increasing the impedance across the PTC layer 315. As the bubbles of gaseous agent 330b continue to grow, the PTC material 315 may be configured to release the gaseous agent, such as once a thermal threshold has been reached. The release of the bubbles of gaseous agent 330 may cause the fuse to blow in embodiments.

The gaseous agent 330 may be released into the battery enclosure, which may provide a negligible effect due to the minimal amount of gaseous agent included within the PTC material 315. Release of the gaseous agent 330 may eliminate continuity through the PTC material 315 causing an irreversible break of current flow through the device. Additionally, the expansion caused by the volumetric increase in the bubbles of gaseous agent 330 may separate conductive regions 305, 310. For example, release of the bubbles of gaseous agent 330 may also release the conductive regions 305, 310 as spring elements as previously described. Accordingly, the combination of any of the PTC material, the conductive material, or the gaseous agent may provide a resettable or non-resettable fuse element. By providing a non-resettable fuse, for example, fault conditions may be prevented from cycling, which may cause additional damage to the device in which the fuse is housed. Additionally, the non-resettable fuse may prevent subsequent damage or leakage from the enclosure by ensuring the device, which may include an aluminum enclosure or similar metal, does not reach and maintain anode potential as previously described.

Figure 4:
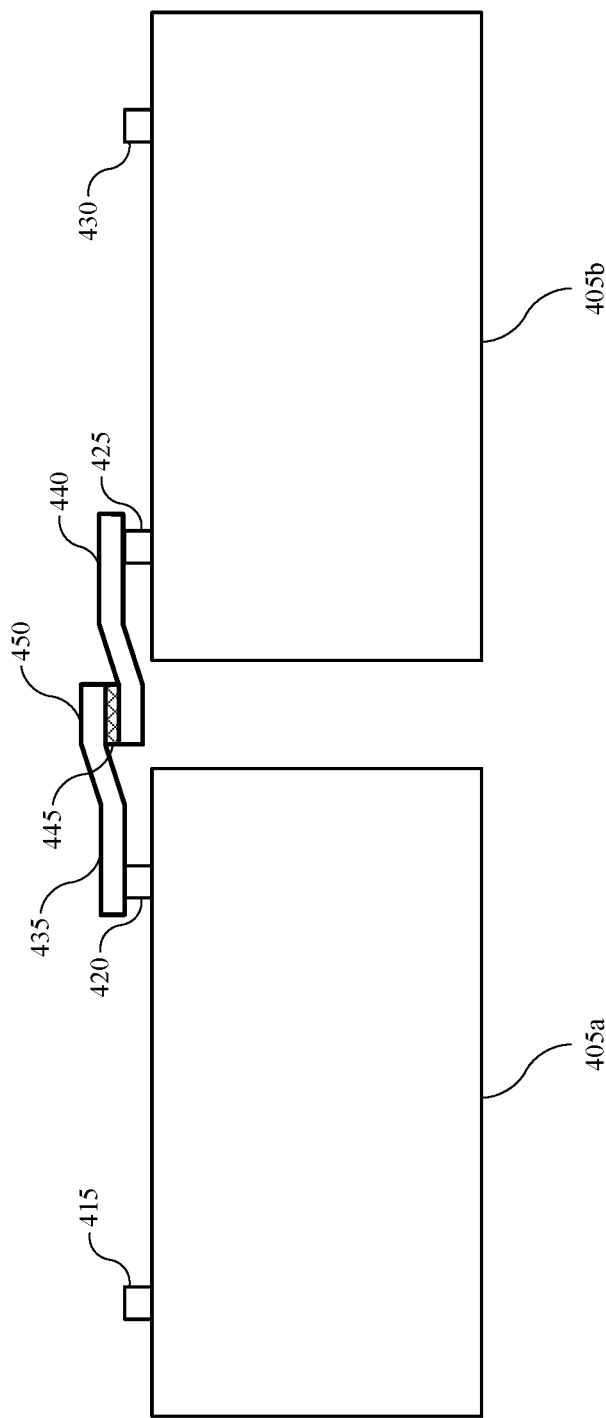
FIG. 4 shows an exemplary multi-cell design according to embodiments of the present technology.

FIG. 4 shows an exemplary multi-cell design according to embodiments of the present technology that may utilize the PTC material as described above. Unlike the previous embodiments utilizing an internal fuse element, FIG. 4 illustrates a design utilizing a similar heat-sensitive material that may be external to the individual devices. As shown in the figure, multiple cells 405a-b may illustrate individual cells of a single battery, or may illustrate distinct batteries. If cells 405a-b are individual cells of a single battery, an additional enclosure (not shown) may be included housing all of the elements illustrated in FIG. 4. Although showing two cells in the figure, any number of cells or batteries may be coupled in a similar fashion, and exemplary structures may include a plurality of battery cells contained within an enclosure. An exemplary battery may include 2 cells, 3 cells, 4 cells, 5 cells, 6 cells, 7 cells, 8 cells, 9 cells, 10 cells, or more, with one or more bus bars included between and coupling individual cells together.

Cell 405a may include an anode terminal 415 and a cathode terminal 420. Cell 405b may include an anode terminal 425 as well as a cathode terminal 430. As illustrated, a bus bar 450 may be used to couple the two cells in series by connecting cathode terminal 420 of cell 405a to anode terminal 425 of cell 405b. Although illustrating a series connection, it is to be understood that the present technology additionally may be utilized with parallel configurations with one or more bus bars connecting external terminals of the individual cells.

Bus bar 450 may include a similar configuration as the PTC fuse 315 previously described. Bus bar 450 may include conductive portions 435, 440, with each conductive portion being electrically coupled with an external terminal of a battery cell. As illustrated, a first conductive portion 435 of bus bar 450 may be electrically coupled with external terminal 420 of cell 405a. Additionally, a second conductive portion 440 of bus bar 450 may be electrically coupled with external terminal 440 of cell 405b. A heat-sensitive device 445 may be positioned along the bus bar 450, and may be coupling the two portions 435, 440 of bus bar 450 between the two battery cells 405a-b.

Heat-sensitive device 445 may be similar to or include any of the features of the PTC material 315 previously described. In embodiments, the heat-sensitive device may be configured to interrupt heat transfer along the bus bar from the first cell 405a to the second cell 405b. For example, an individual cell of a plurality of cells coupled in series with bus bars may short-circuit. If the fault is not controlled, thermal runaway may occur within the cell causing a catastrophic failure of the cell. The heat generated by the first cell may propagate along the bus bar to the next cell in series. If not contained, the thermal runaway temperature may be transferred from one cell to the next until all fail in turn. Heat-sensitive device 445 advantageously reduces heat transfer through bus bar 450.

Utilizing the example scenario above, if cell 405a reaches thermally unstable temperatures, these temperatures will transfer along bus bar section 435, regardless of the actual current flowing across the devices. Heat-sensitive device 445 may be used to ensure that destructive temperatures are not further transferred to cell 405b. As the temperature rises across heat-sensitive device 445, the material may expand or a gaseous agent may be released as previously described, causing a non-resettable interruption across the fuse. This heat-sensitive element interrupt may prevent both temperature and current transfer from cell 405a to cell 405b. Accordingly, and depending on the electrical connections across the battery, the battery may still function, although with reduced capacity. Additionally, the isolation of the faulty cell 405a may protect both the rest of the battery as well as the device in which the battery is located from further damage that may be caused by the battery malfunction.

Figure 5A:
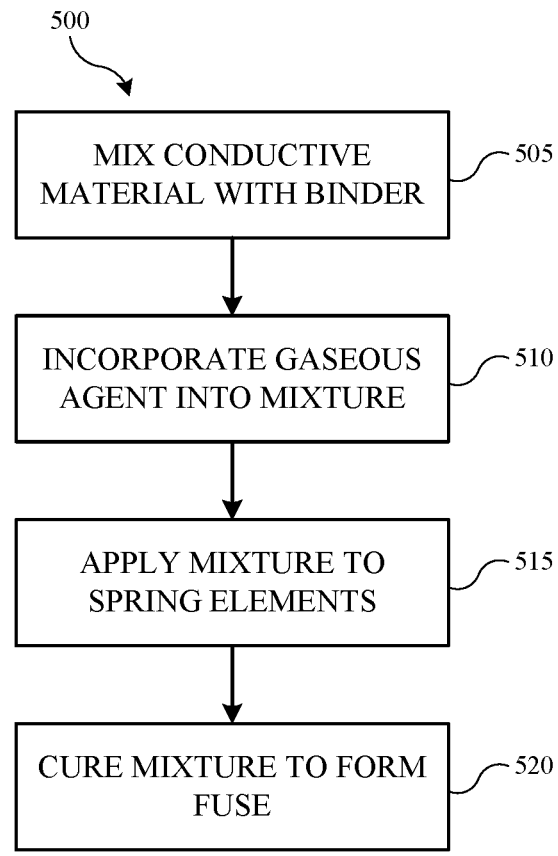
FIG. 5A shows a method of forming a fuse according to embodiments of the present technology.

Turning to FIG. 5A is shown a method 500 of forming a fuse or heat-sensitive device according to embodiments of the present technology. As illustrated, method 500 may include mixing a conductive material with a binder material at operation 505. The binder material may include one or more polymer materials as previously described, and may include polypropylene, polyethylene, poly(vinyl acetate), poly(methyl methacrylate), or any other polymer materials that may be useful as bonding agents or structural components of the heat-sensitive device. The conductive material may include particles, powders, or other material sizes of conductive elements. The conductive materials may be any of the metals previously described, and may also be a non-metal conductive material that may allow or improve current flow, or reduce impedance, across the heat-sensitive device.

A gaseous agent may be incorporated into the mixture at operation 510. The gaseous agent may include any of the materials or restrictions previously discussed. The gaseous agent may be bubbled or directed into the mixture, and in embodiments the mixture may be further blended to reduce the size of bubbles of the gaseous agent. At operation 515, the mixture may be applied to surfaces such as spring elements or any other surfaces via any of a variety of application methods as would be understood by the skilled artisan. At operation 520, the mixture may be cured. If utilized, the spring elements may be clamped or otherwise maintained in a stressed position during the curing operation until the heat-sensitive device is sufficiently cured to overcome the restoring forces of the spring elements.

Figure 5B:
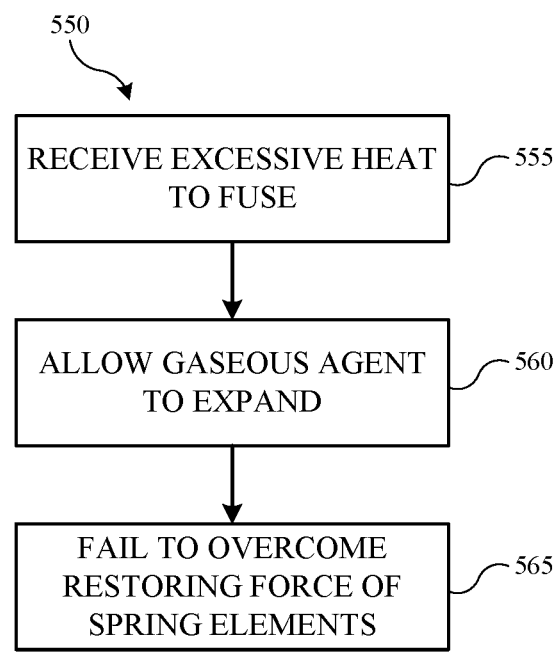
FIG. 5B shows a method including operations during an exemplary fuse fault event according to embodiments of the present technology.

FIG. 5B shows a method 550 including operations during an exemplary fuse or heat-sensitive device fault event according to embodiments of the present technology. The method may include receiving excessive heat to the fuse or heat-sensitive device at operation 555. Excessive heat may be heat outside of a normal operating range, or heat that is at a temperature that may cause a physical or chemical change to the fuse or heat-sensitive device. The change may be sufficient to be irreversible in embodiments. For example, the change may be at a temperature sufficient to cause or allow a gaseous agent included within the fuse or heat-sensitive element to expand at operation 560. This expansion may weaken the bonding or tensile forces within the fuse or heat-sensitive device as previously described. At operation 565, the expansion may cause the fuse or heat-sensitive device to fail to overcome the restoring force of one or more of the spring elements, which may release, causing a non-resettable interrupt of the fuse element.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s) ", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. An energy storage device comprising:
   an enclosure;
   a cathode current collector housed within the enclosure;
   a cathode terminal accessible at an external location of the enclosure, wherein the cathode terminal is electrically coupled with the cathode current collector;
   an anode current collector housed within the enclosure;
   an anode tab coupled with the anode current collector, wherein the anode tab is housed within the enclosure, and wherein the anode tab comprises copper at an edge region of the anode tab;
   an anode terminal accessible at an external location of the enclosure, wherein the anode terminal is electrically coupled with the anode tab, and wherein the anode terminal comprises copper at an edge region of the anode terminal;
   a fuse housed within the enclosure, wherein the fuse is positioned between, and in electrical communication with, the anode terminal and the anode tab, and wherein the fuse comprises a layer of positive temperature coefficient ("PTC") material positioned between and coupling the anode tab and the anode terminal at the edge region of the anode tab and the edge region of the anode terminal, and wherein the two regions of copper comprise tension springs configured to release away from one another along an axis when the fuse is blown.

2. The energy storage device of claim 1, further comprising a current bypass device coupled along an external position of the enclosure, wherein the current bypass device is configured to bypass current to the anode terminal during operation of the current bypass device.

3. The energy storage device of claim 1, wherein the enclosure comprises aluminum.

4. The energy storage device of claim 1, wherein the layer of PTC material is configured to overcome the restoring force of the tension springs under normal operating conditions.

5. The energy storage device of claim 1, wherein the PTC material comprises a conductive material mixed with a binder.

6. The energy storage device of claim 5, wherein the conductive material comprises at least one material selected from the group consisting of silver, copper, zinc, nickel, and carbon-containing materials.

7. The energy storage device of claim 5, wherein the binder comprises an acrylate polymer.

8. The energy storage device of claim 5, wherein the PTC material further comprises a gaseous agent contained within the binder under normal operating conditions.

9. The energy storage device of claim 8, wherein the gaseous agent comprises molecules having an effective length below about 10 Å.

10. The energy storage device of claim 8, wherein the PTC material is configured to release the gaseous agent at a thermal threshold, and wherein the release of the gaseous agent causes the fuse to blow.

11. A battery cell comprising:
a housing;
a cathode terminal positioned at an exterior of the housing; and
an anode terminal positioned at an exterior of the housing and comprising copper at an end of the anode terminal;
wherein the housing contains:
a cathode current collector electrically coupled with the cathode terminal,
an anode current collector electrically coupled with the anode terminal, wherein the anode current collector comprises copper at an end of the anode current collector, and
a fuse included in series between the electrically coupled anode current collector and anode terminal, wherein the fuse comprises a positive temperature coefficient ("PTC") material positioned between and coupling the anode current collector and the anode terminal, and wherein the fuse couples the copper at the end of the anode terminal with the copper at the end of the anode current collector, and wherein the copper at the end of the anode terminal and the copper at the end of the anode current collector each comprise tension springs configured to release away from one another along an axis when the fuse is blown.

12. The battery cell of claim 11, further comprising a device configured to provide current bypass to the anode terminal.

13. A battery comprising:
an enclosure;
a plurality of battery cells contained within the enclosure;
a bus bar contained within the enclosure and connecting at least two battery cells of the plurality of battery cells at external terminals of the at least two battery cells; and
a heat-sensitive device positioned along the bus bar and coupling two portions of the bus bar between the at least two battery cells of the plurality of battery cells, wherein the heat-sensitive device is releasably coupling two spring members of the bus bar, and wherein the two spring members of the bus bar are configured to release away from one another at least partially normal to a plane through the heat-sensitive device.

14. The battery of claim 13, wherein the heat-sensitive device is configured to interrupt heat transfer along the bus bar from a first cell of the at least two battery cells of the plurality of battery cells to a second cell of the at least two battery cells.

* * * * *